United States Patent

[11] 3,538,944

[72] Inventor Robert Michael Riordan
Simsbury, Connecticut
[21] Appl. No. 708,998
[22] Filed Feb. 28, 1968
[45] Patented Nov. 10, 1970
[73] Assignee Dresser Industries, Inc.
a corporation of Delaware

[54] PILOT-ACTUATED SHUT-OFF VALVE
6 Claims, 3 Drawing Figs.
[52] U.S. Cl. ............................................. 137/496, 251/45
[51] Int. Cl. .................................................. F16k 7/17
[50] Field of Search........................................ 251/45, 46, 34, 36; 137/496

[56] References Cited
UNITED STATES PATENTS
1,297,836  3/1919  Gulick............................. 251/36
2,811,168  10/1957  Davies et al. ................... 251/46X
FOREIGN PATENTS
168,510  6/1934  Switzerland..................... 251/46

*Primary Examiner*—Arnold Rosenthal
*Attorney*—Robert W. Mayer, Russell E. Schlorff, Daniel Rubin, Peter J. Murphy, Roy L. Van Winkle and William E. Johnson, Jr.

ABSTRACT: A fluid control system comprising a fluid supply source, an outlet and a conduit connecting the supply source to the outlet. A shutoff valve in the conduit is connected to a flexible pressure responsive diaphragm that operates to open and close the valve. One side of the diaphragm communicates directly with the fluid supply source and a chamber on the opposite side of the diaphragm communicates with the fluid supply source through a vent hole in the diaphragm. A bypass line connects the chamber to the conduit portion downstream of the shutoff valve and a pilot valve in the bypass line has a flow area greater than that of the vent hole in the diaphragm. When the pilot valve is closed, pressure in the fluid supply source provides substantially equal pressures on opposite sides of the diaphragm to maintain the shutoff valve closed, and when the pilot valve is open, fluid pressure in the chamber is relieved and the greater pressure on the side of the diaphragm opposite the chamber functions to cause the diaphragm to open the shutoff valve.

Patented Nov. 10, 1970  3,538,944

PILOT-ACTUATED SHUT-OFF VALVE

BACKGROUND OF THE INVENTION

The present invention relates to a fluid control system having a shutoff valve, and more particularly to a system having a pilot-actuated shutoff valve for controlling the flow of fluid from a supply source to an outlet.

Most fluid handling and dispensing systems require basic valving arrangements for controlling fluid flow in a safe manner. Main shutoff valves as well as relief and check valves are needed to effectuate the control of fluid through these dispensing and handling systems. In the past, proper and safe control of the fluid was accomplished by providing valves as well as mechanical linkages and valve operators at various locations in the handling and dispensing systems. The net result was a system characterized by the expense involved in its production as well as the cumbersome nature of the overall system caused by providing the various individual valve elements.

Accordingly, it is an object of the present invention to provide a fluid control system having a simple, easy-to-use and highly reliable pilot-actuated shutoff valve for controlling fluid flow through a conduit from a fluid supply source to an outlet.

Another object of the present invention is to provide a pilot-actuated shutoff valve for controlling fluid flow with the added feature of providing check and relief functions.

SUMMARY OF THE INVENTION

In accordance with the present invention a fluid control system is provided comprising a fluid supply source connected to an outlet by a conduit, with a shutoff valve in the conduit. A flexible pressure responsive diaphragm is connected to open and close the shutoff valve and one side of the diaphragm is disposed so that it communicates with the fluid supply source. A chamber is located on the side of the diaphragm opposite the fluid supply source and a vent hole in the diaphragm connects the supply source to the chamber. The chamber is connected to the conduit portion downstream of the shutoff valve by a bypass line and a pilot valve is positioned in the bypass line. The flow area of the pilot valve is greater than the flow area of the vent hole in the diaphragm so that when the pilot valve is closed, pressure in the fluid supply source provides substantially equal pressures on opposite sides of the diaphragm to maintain the shutoff valve closed. When the pilot valve is open, fluid pressure in the chamber is relieved at a greater rate than the supply of fluid pressure to the chamber through the vent hole from the supply source. Thus, a greater force is developed on the side of the diaphragm opposite the chamber than the force of the pressure within the chamber, and this force differential functions to cause the diaphragm to open the shutoff valve.

A biasing device in the chamber acts against the diaphragm to maintain the shutoff valve closed. When the pilot valve is open, the force of the fluid pressure in the supply source acting on the diaphragm to open the shutoff valve must be greater than the force of the fluid pressure in the chamber acting against the diaphragm to close the shutoff valve. When this force differential is greater than the force of the biasing device the shutoff valve opens. In one form of the invention the biasing device is a coil spring.

The fluid control system of the present invention also includes an imperforate pressure responsive diaphragm adjacent the vented diaphragm and spaced therefrom by the first chamber. A second chamber located on the other side of the imperforate diaphragm is connected to the conduit portion downstream of the shutoff valve by a passageway. When the pilot valve is closed, excessive pressure in the conduit portion downstream of the shutoff valve, usually caused by an expansion of the fluid confined therein, urges the imperforate diaphragm toward the vented diaphragm with a substantially greater force than the force generated by the excessive pressure to open the shutoff valve. This force differential operates to prevent the shutoff valve from opening under the influence of excessive pressure in the conduit downstream of the shutoff valve.

When a biasing device is disposed between the vented and imperforate diaphragms the imperforate diaphragm urges the biasing device against the vented diaphragm to prevent the shutoff valve from opening when the pressure in the conduit portion downstream of the shutoff valve is excessive.

The pilot valve is also biased to its closed position by a biasing device in the form of a coil spring. The force of this spring acts in a direction opposite to the direction of the force generated to open the pilot valve by the pressure in the conduit portion downstream of the shutoff valve. Excessive pressure in the conduit portion downstream of the shutoff valve is relieved when the force generated by that pressure on the pilot valve is greater than the force of the coil spring connected to close the pilot valve. This force differential opens the pilot valve to relieve the excessive pressure.

BRIEF DESCRIPTION OF THE DRAWING

Novel features and advantages of the present invention in addition to those mentioned above will become apparent to one skilled in the art from a reading of the following detailed description in conjunction with the accompanying drawing wherein similar reference characters refer to similar parts and in which.

DETAILED DESCRIPTION OF THE INVENTION

Figure 1:
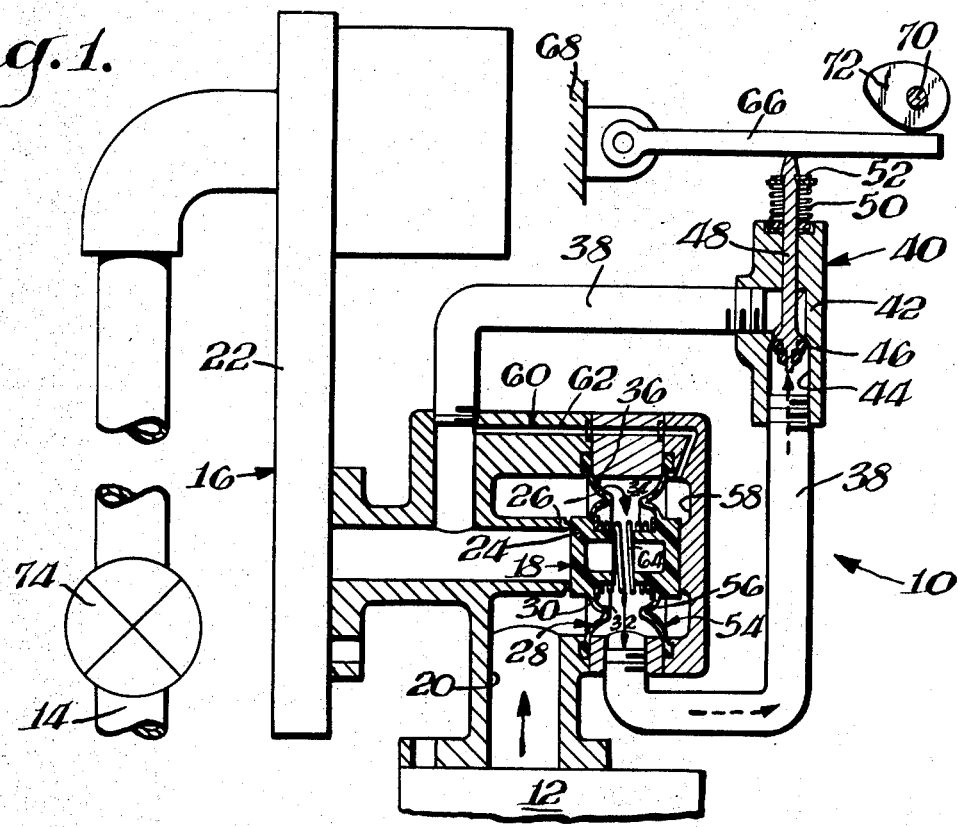
FIG. 1 is a diagrammatic view of a fluid control system according to the present invention.

Referring in more particularity to the drawing, a fluid control system 10 comprises a fluid supply source 12 connected to an outlet 14 by a conduit 16. A shutoff valve 18 is positioned within the conduit for controlling the flow of fluid from the source 12 to the outlet 14, as explained more fully below. The shutoff valve divides the conduit into an upstream portion 20 and a downstream portion 22.

The shutoff valve 18 includes a plug 24 that moves toward and away from valve seat structure 26 to close and open the shutoff valve. A flexible pressure responsive vented diaphragm 28 is integrally connected to the valve plug 24 and movement of the diaphragm functions to open and close the shutoff valve. As shown in the drawing, one side 30 of the pressure responsive vented diaphragm communicates directly with the fluid in the supply source via the upstream conduit portion 20, and the force developed by the fluid pressure in the supply source acts against the side 30 of the vented diaphragm to open the shutoff valve. The opposite side 32 of the flexible vented diaphragm is exposed to a chamber 34 so that the force of the fluid pressure in the chamber acts against the side 32 of the vented diaphragm to close the shutoff valve. The flexible vented diaphragm 28 has a vent hole 36 that provides communication between the chamber 34 and the fluid supply source 12.

The chamber 34 is connected to the downstream portion 22 of the conduit 16 by a bypass line 38 and a pilot valve 40 is located in the bypass line. The pilot valve includes a housing 42 with an internal passageway 44 connected to the bypass line. A valve plug 46 is connected to the exterior of the housing 42 by a valve stem 48 and a coil spring 50 surrounds the stem. The coil spring reacts between a collar 52 connected to the stem 48 and the exterior of the housing to urge the pilot valve closed, as shown in FIG. 1. For reasons discussed more fully below, the flow area of the pilot valve 40 is considerably greater than that of the vent hole 36 in the vented diaphragm 28.

The fluid control system 10 also includes an imperforate flexible pressure responsive diaphragm 54 located adjacent the vented diaphragm 28 and spaced therefrom by the chamber 34. One side 56 of the imperforate diaphragm communicates with a second chamber 58 connected to the downstream conduit portion 22 by a passageway 60 comprising a line 62 and a portion of the bypass line 38.

A coil spring 64 is located in the chamber 34 between the vented diaphragm 28 and the imperforate diaphragm 54. The coil spring urges the diaphragms away from each other and the function of this spring is described more fully below.

The pilot valve 40 is operated by providing an actuating arm 66 pivoted at one end to a support surface 68. The arm rests against the valve stem 48 of the pilot valve and is driven downwardly by rotating a start shaft 70 connected to a cam 72. As can readily be understood, counterclockwise rotation of the start shaft causes the cam 72 to move the actuating arm 66 and the valve stem 48 in a downward direction which in turn moves the plug 46 away from its seat structure.

FIG. 1 illustrates the various components of the fluid control system 10 in their nondispensing positions. When fluid flow from the source 12 to the outlet 14 is desired, a pump connected to the supply source is actuated whereby the fluid in the supply source is delivered under pressure to the upstream portion 20 of the conduit 16. The pilot valve 40 is closed and the fluid pressure in the upstream portion 20 of the conduit 16 is transmitted to the chamber 34 through the vent hole 36 in the pressure responsive vented diaphragm 28. Accordingly, the pressures on the opposite sides of the vented diaphragm 28 are substantially equal whereby the valve plug 24 remains in the position illustrated in FIG. 1 and prevents flow from the source 12 to the outlet 14. The coil spring 64 also assists in maintaining the shutoff valve closed under these conditions.

Figure 2:
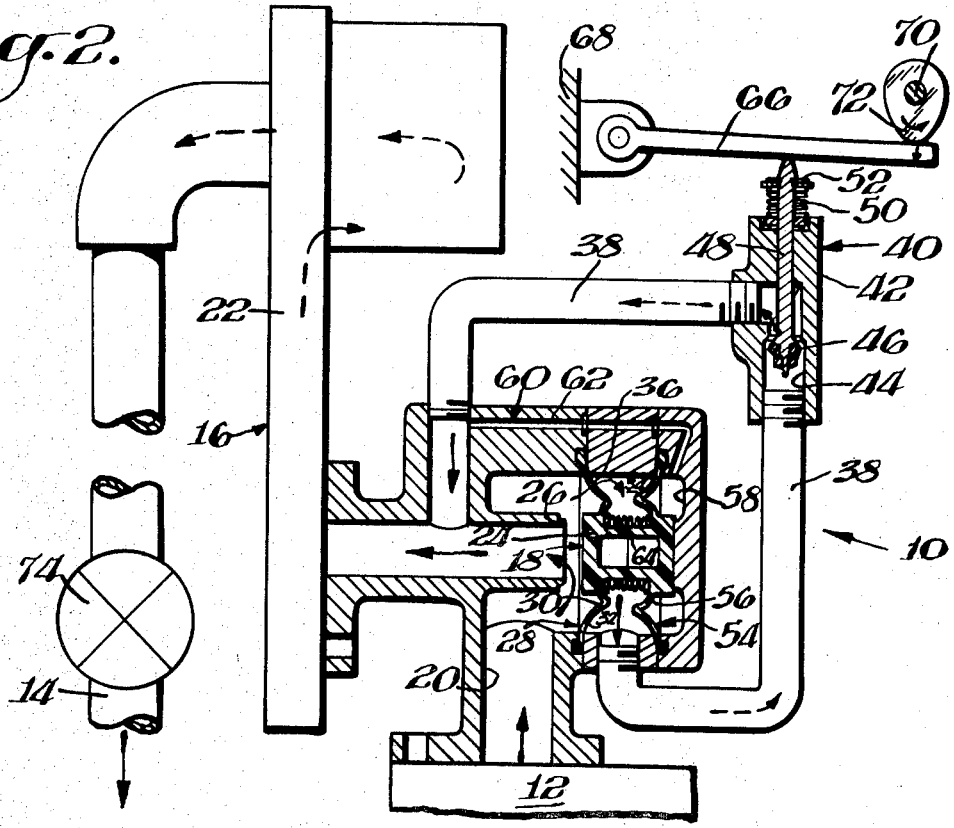
FIG. 2 is a diagrammatic view of the fluid control system of FIG. 1 illustrating a different sequence of operation.

Rotation of the start shaft 70 opens the pilot valve 40 by urging the valve stem 48 downwardly against the force of the coil spring 50. As explained above, the flow area of the pilot valve is substantially greater than the flow area of the vent hole 36 in the flexible vented diaphragm 28. This flow area differential relieves the pressure in the chamber 34 at a much greater rate than the supply thereto through the vent hole 36 from the fluid supply source 12. Accordingly, the force acting on the side 30 of the vented diaphragm 28 is substantially greater than the force acting on the opposite side 32 of the diaphragm. When the force differential is greater than the force generated by the coil spring 64 to maintain the shutoff valve closed, the vented diaphragm 28 moves to the right, as viewed in the drawing, to the position shown in FIG. 2. The vented diaphragm 28 being connected to the valve plug 24 moves the plug away from the seat structure 26 to thereby open the shutoff valve 18. Fluid then flows from the supply source 12 through the conduit 16 to the outlet 14. The outlet may be provided with a valve 74, such as the type found in a dispensing nozzle, and actuation of that valve causes the fluid to flow through the outlet. Fluid continues to flow from the supply source to the outlet as long as the pump is operating and the pilot and nozzle valves are open. For convenience the supply pump as well as the pilot valve can be connected to the start shaft 70 so that rotation of that shaft activates the pump and opens the pilot valve. Reverse rotation of the shaft operates to deactivate the pump and close the pilot valve.

Fluid flow is terminated by closing either the pilot valve 40 or the nozzle valve 74 at the outlet 14. As can readily be understood, the pilot valve is closed by rotating the start shaft 70 in a clockwise direction, as viewed in the drawing. The coil spring 50 then assists in returning the pilot valve to its closed position.

Figure 3:
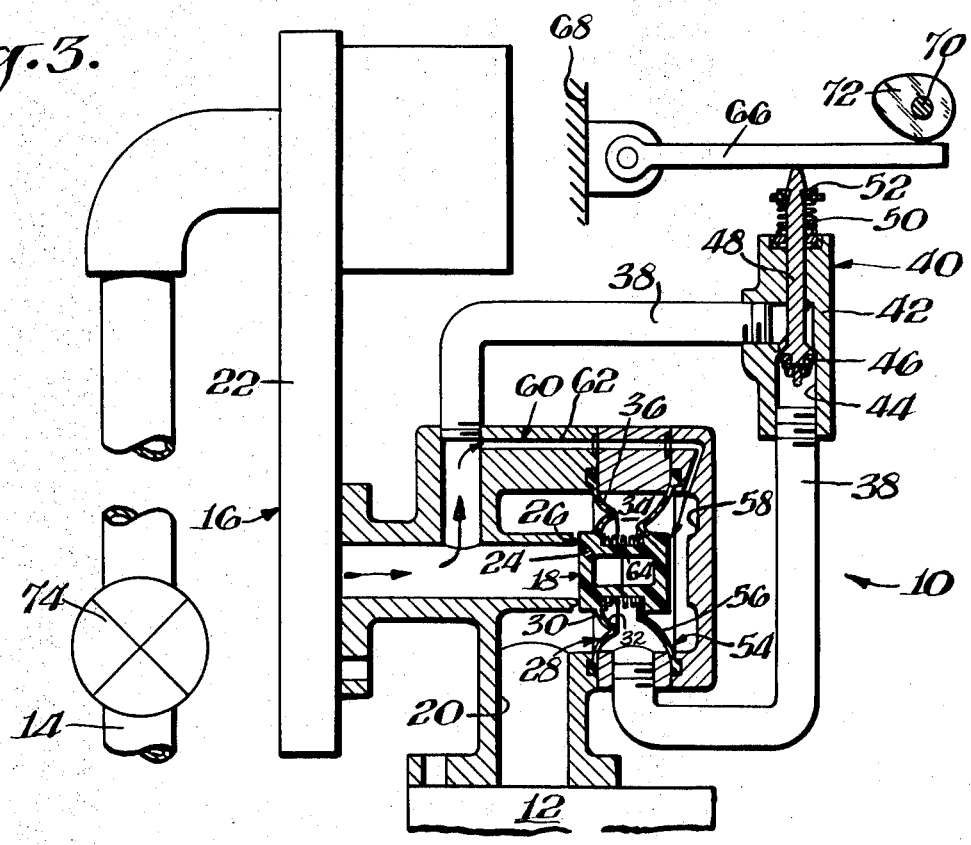
FIG. 3 is a diagrammatic view of the fluid control system of FIG. 1 illustrating still another sequence of operation.

FIG. 3 shows the fluid control system 10 as it functions to prevent the shutoff valve 18 from opening under nonoperating conditions. In this regard, an excessive buildup of pressure in the downstream portion 22 of the conduit 16 is prevented from opening the shutoff valve by directing the excessive pressure to the second chamber 58 through the passageway 60 comprising a portion of the bypass line 38 and the line 62. Accordingly, regardless of the pressure in the downstream portion 22 of the conduit 16, a greater force is generated to close the shutoff valve 18 than to open it. The force generated to close the shutoff valve or maintain it in its closed position is accomplished by urging the imperforate diaphragm 54 toward the vented diaphragm 28, as shown in FIG. 3. Coil spring 64 is compressed and the force generated by the excessive pressure in the second chamber 58 against the imperforate diaphragm is transmitted to the side 32 of the vented diaphragm 28. Thus, a force differential is established due to the different surface areas against which the excessive pressure acts. The surface area of the imperforate diaphragm 54 being substantially greater than the surface area of the portion of the plug 24 exposed to the excessive pressure creates the desired force differential to maintain the shutoff valve 18 closed under these conditions.

When the fluid pressure in the downstream portion 22 of the conduit 16 becomes even more excessive the pilot valve 40 is opened to relieve that pressure. In this regard, the force of the coil spring 50 connected to close the pilot valve is designed so that a predetermined pressure acting on the valve plug 46 of the pilot valve develops a force greater than the force of the coil spring 50 to thereby open the valve and relieve the pressure.

The fluid control system of the present invention functions particularly well to control the flow of gasoline during a dispensing operation at a filling station. As explained above, both the supply pump and the pilot valve can be connected to the start shaft which in the case of a gasoline dispenser can in turn be conveniently connected to a handle on the exterior of the gasoline dispenser housing. Operation of the handle and the nozzle valve at the outlet control the flow of gasoline through the system.

I claim:

1. A fluid control system comprising a fluid supply source, an outlet, a conduit connecting the supply source to the outlet, a shutoff valve in the conduit, a flexible pressure responsive diaphragm connected to open and close the shutoff valve, one side of the diaphragm communicating with the fluid supply source, a chamber on the opposite side of the diaphragm, a vent hole in the diaphragm connecting the fluid supply source to the chamber, a bypass line connecting the chamber to the conduit downstream of the shutoff valve, a pilot valve in the bypass line having a flow area greater than that of the vent hole whereby when the pilot valve is closed, pressure in the fluid supply source provides substantially equal pressures on opposite sides of the diaphragm to maintain the shutoff valve closed, and when the pilot valve is open, fluid pressure in the chamber is relieved and the greater pressure on the side of the diaphragm opposite the chamber functions to cause the diaphragm to open the shutoff valve, pressure responsive means adjacent said chamber forming a second chamber, said second chamber being in communication with only the conduit downstream of said shutoff valve, and said pressure responsive means operably engaging said shutoff valve to close said shutoff valve in response to a pressure increase on the conduit downstream of said shutoff valve whereby said increased pressure is prevented from entering the conduit upstream of said shutoff valve.

2. A fluid control system as in claim 1 including biasing means in the first-mentioned chamber acting against the diaphragm to maintain the shutoff valve in its closed position whereby when the pilot valve is open the fluid pressure from the supply source acting on the side of the diaphragm opposite the first-mentioned chamber must be greater than the fluid pressure in the first-mentioned chamber by the force of the biasing means in order to open the shutoff valve.

3. A fluid control system as in claim 1 including biasing means connected to close the pilot valve, the force of the biasing means having a direction opposite to the direction of the force generated by the pressure in the conduit downstream of the shutoff valve whereby excessive pressure in the conduit downstream of the shutoff valve opens the pilot valve when the force of the excessive pressure on the pilot valve is greater than the force of the biasing means.

4. A fluid control system comprising a fluid supply source, an outlet, a conduit connecting the supply source to the outlet, a shutoff valve in the conduit, a flexible pressure responsive diaphragm connected to open and close the shutoff valve, one side of the diaphragm communicating with the fluid supply source, a chamber on the opposite side of the diaphragm, a vent hole in the diaphragm connecting the fluid supply source to the chamber, a bypass line connecting the chamber to the conduit downstream the shutoff valve, a pilot valve in the bypass line having a flow area greater than that of the vent hole whereby, when the pilot valve is closed, pressure in the fluid supply source provides substantially equal pressures on opposite sides of the diaphragm to maintain the shutoff valve closed, and, when the pilot valve is opened, fluid pressure in the chamber is relieved and the greater pressure on the side of the diaphragm opposite the chamber functions to close the diaphragm to open the shutoff valve, and an imperforate, pressure responsive diaphragm adjacent the vented diaphragm and spaced therefrom by the chamber, a second chamber on the side of the imperforate diaphragm opposite the first-mentioned chamber, and a passageway connecting the second chamber to the conduit downstream of the shutoff valve whereby excessive pressure in the conduit downstream of the shutoff valve urges the imperforate diaphragm towards the vented diaphragm to prevent the shutoff valve from opening under the influence of excessive pressure in the conduit.

5. A fluid control system as in claim 4 including biasing means disposed between the vented and imperforate diaphragms and wherein the imperforate diaphragm urges the biasing means against the vented diaphragm to prevent the shutoff valve from opening when the pressure in the conduit downstream of the shutoff valve is excessive.

6. A fluid control system as in claim 5 wherein biasing means is a coil spring.